(12) United States Patent
Yamauchi et al.

(10) Patent No.: US 11,385,717 B2
(45) Date of Patent: Jul. 12, 2022

(54) VEHICLE INPUT DEVICE WITH UNIFORM TACTILE FEEDBACK

(71) Applicant: DENSO CORPORATION, Kariya (JP)

(72) Inventors: Shunji Yamauchi, Kariya (JP); Harunori Fujitsu, Obu (JP); Kazuteru Itou, Obu (JP)

(73) Assignee: DENSO CORPORATION, Kariya (JP)

( * ) Notice: Subject to any disclaimer, the term of this patent is extended or adjusted under 35 U.S.C. 154(b) by 20 days.

(21) Appl. No.: 17/132,488

(22) Filed: Dec. 23, 2020

(65) Prior Publication Data

US 2021/0132696 A1 May 6, 2021

Related U.S. Application Data

(63) Continuation of application No. PCT/JP2019/019423, filed on May 16, 2019.

(30) Foreign Application Priority Data

Jun. 28, 2018 (JP) .............................. JP2018-123440

(51) Int. Cl.
*G06F 3/01* (2006.01)
*B60K 35/00* (2006.01)
*G06F 3/041* (2006.01)

(52) U.S. Cl.
CPC .............. *G06F 3/016* (2013.01); *B60K 35/00* (2013.01); *G06F 3/041* (2013.01);
(Continued)

(58) Field of Classification Search
CPC ........................ B60K 2370/158; G06F 3/016
See application file for complete search history.

(56) References Cited

U.S. PATENT DOCUMENTS

2007/0035526 A1 2/2007 Takenaka et al.
2018/0196518 A1 7/2018 Shibata et al.
(Continued)

FOREIGN PATENT DOCUMENTS

| JP | 3758924 B2 | 8/2001 |
| JP | 2010-230438 A | 10/2010 |
| JP | 2012-113419 A | 6/2012 |

OTHER PUBLICATIONS

Research-Article: Tunca et al.,Advantages of Active Haptics on Touch Surfaces, Oct. 2016, Automotive'UI 16: Proceedings of the 8th International Conference on Automotive User Interfaces and Interactive Vehicular Applications, pp. 137-144.*
(Continued)

*Primary Examiner* — Laurence J Lee
(74) *Attorney, Agent, or Firm* — Posz Law Group, PLC

(57) ABSTRACT

A vehicle input device includes: an interior panel that is an opaque plate-shaped member; and multiple fixing portions for fixing the interior panel to a vehicle. In the interior panel, an operation area portion in which multiple symbols indicating multiple control contents and a non-operation area portion are set. On a rear surface side of the operation area portion, a press sensor for detecting a press operation on a switch portion and a vibrator that vibrates the operation area portion are placed. The switch portion is a portion in which the multiple symbols are placed. The vehicle input device includes a controller that specifies an operation content and causes the vibrator to vibrate. The multiple fixing portions are placed in the non-operation area portion and are not placed in the operation area portion.

16 Claims, 5 Drawing Sheets

(52) U.S. Cl.
CPC .. *B60K 2370/143* (2019.05); *B60K 2370/158* (2019.05); *B60K 2370/794* (2019.05)

(56) References Cited

U.S. PATENT DOCUMENTS

2018/0253157 A1\* 9/2018 Pan ..................... B60K 37/06
2018/0292904 A1\* 10/2018 Müller ................ G06F 3/041

OTHER PUBLICATIONS https://www.cars.com/articles/2013-toyota-avalon-does-capacitive-touch-controls-right-1420663078448/ (published Mar. 13, 2013), Not provided. Retrieved by Examiner and considered.

\* cited by examiner (VISUAL RECOGNITION SIDE)

VEHICLE INPUT DEVICE WITH UNIFORM TACTILE FEEDBACK

CROSS REFERENCE TO RELATED APPLICATIONS

The present application is a continuation application of International Patent Application No. PCT/JP2019/019423 filed on May 16, 2019, which designated the U.S. and claims the benefit of priority from Japanese Patent Application No. 2018-123440 filed on Jun. 28, 2018. The entire disclosures of all of the above applications are incorporated herein by reference.

TECHNICAL FIELD

The present disclosure relates to a vehicle input device that is attached to a vehicle and used.

BACKGROUND

As a vehicle input device for users to operate an in-vehicle equipment (hereinafter, air conditioner or the like) such as the air conditioner or an audio equipment, there is a configuration in which an operation panel including a mechanical switch is placed at an instrument panel. Here, the mechanical switch refers to a thing having a portion that is operated (for example, pressed) by a human, is a toggle switch, a rocker switch, a push button switch, a rotary switch, a slide switch, or the like, and is movable.

SUMMARY

A vehicle input device may include: an interior panel that may be an opaque plate-shaped member; and multiple fixing portions for fixing the interior panel to a vehicle. In the interior panel, an operation area portion in which multiple symbols indicating multiple control contents and a non-operation area portion may be set. On a rear surface side of the operation area portion, a press sensor for detecting a press operation on a switch portion and a vibrator that vibrates the operation area portion may be placed. The switch portion may be a portion in which the multiple symbols may be placed. The vehicle input device includes a controller that may specify an operation content and cause the vibrator to vibrate. The multiple fixing portions may be placed in the non-operation area portion and may not be placed in the operation area portion.

BRIEF DESCRIPTION OF DRAWINGS

The above and other features and advantages of the present disclosure will be more clearly understood from the following detailed description with reference to the accompanying drawings. In the accompanying drawings.

DETAILED DESCRIPTION

Figure 1:
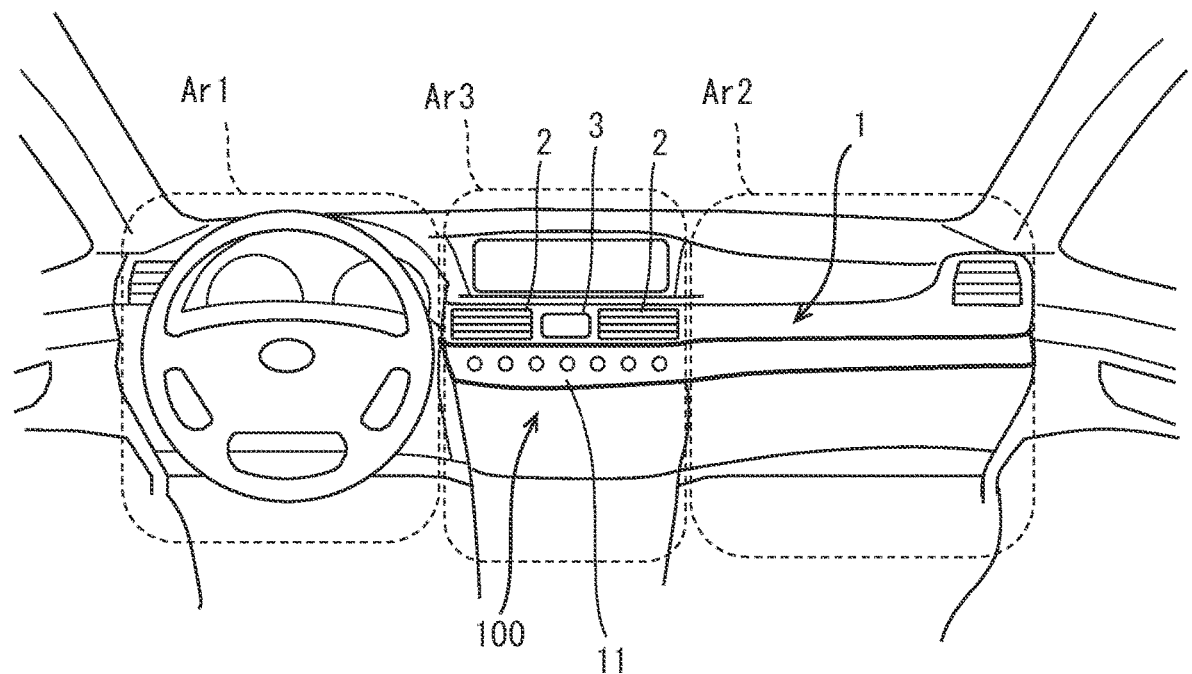
FIG. 1 is a view for illustrating a faceplate that is an interior panel functioning as an operation surface of a vehicle input device.

In addition, as a general input device, there is a device (hereinafter, touch panel display device) including a display panel and a touch panel. For example, as a comparative example, there is a configuration of providing a tactile feedback by vibrating the touch panel when detecting that the touch panel is pressed by the user.

In the touch panel display device providing the tactile feedback, the touch panel is sustained by a housing with use of an elastic member such as a rubber in order to easily transmit vibration generated by a vibration generator to a user finger via the touch panel. The vibration direction is a direction parallel to the touch panel. Such a touch panel display device is attached to a center (so-called center cluster) of the instrument panel and is used as a HMI (Human Machine Interface) of a navigation device, for example.

From a viewpoint of design or the like, there is a demand to reduce the number of mechanical switches placed on the instrument panel. As a first study configuration to meet the demand, a configuration in which an image equivalent to a mechanical switch for operating the air conditioner is displayed on the touch panel display device (for example, navigation device) placed at the instrument panel is considered. The first study configuration corresponds to a configuration using the touch panel display device as the input device such as the air conditioner. The image equivalent to the mechanical switch is an icon image (hereinafter, operation button image) showing a control content that can be instructed by the user.

When the input device for operating the air conditioner or the like with use of the mechanical switches is implemented, the user can operate the air conditioner or the like at an arbitrary timing by operating these mechanical switches. Therefore, in consideration of the operability of the user, even in the first study configuration, it is preferable that the operation button image is constantly displayed on the display while a power source of a vehicle is turned on. In a configuration in which the operation button image is not constantly displayed, when an occupant wants to operate the air conditioner or the like, it is necessary to perform an operation for displaying the operation button image once and select a desired operation button. Therefore, a user convenience is lacked.

However, in the configuration of constantly displaying the operation button for operating the air conditioner or the like on a display of the navigation device, a displayable area for a map image or the like is reduced by the operation button. Therefore, it becomes necessary to increase the size of the display. In the first study configuration, when the display malfunctions, the air conditioner or the like may become inoperable.

As a second study configuration, a configuration in which a touch panel display device only for (that is, dedicated device for) constantly displaying an operation button image for operating the air conditioner or the like is placed separately from the navigation device is considered. However, in the study configuration, the total cost increases due to the display cost. Similarly, to the first study configuration, when the display malfunctions, the display does not function as the input device.

One example of the present disclosure provides a vehicle input device capable of reducing the number of mechanical switches while maintaining a user convenience.

According to one example embodiment, the vehicle input device includes an interior panel that is an opaque plate-shaped member and provides a part of an interior of a vehicle, and multiple fixing portions for fixing the interior panel to the vehicle. In the interior panel, an operation area portion in which multiple symbols indicating multiple control contents in accordance with an instruction capable of being provided by an occupant and a non-operation area portion that is a portion other than the operation area portion are set. In a rear surface side of the operation area portion, a press sensor for detecting a press operation of a user on a switch portion and a vibrator that vibrates the operation area portion in an operation surface orthogonal direction are placed. The switch portion is a portion in which a symbol is placed in a surface of the operation area portion. The operation surface orthogonal direction is a direction orthogonal to the surface of the operation area portion. The vehicle input device includes a controller that specifies an operation content of the occupant based on a detection result of the press sensor and causes the vibrator to vibrate. The multiple fixing portion are placed in the non-operation area portion and not placed in the operation area portion. The operation area portion and the vibrator are connected via a primary transmission member for transmitting vibration generated by the vibrator to the operation area portion. The primary transmission member and the operation area portion are connected by multiple secondary transmission members having elasticity. Each of multiple secondary transmission members is connected to a different position of the operation area portion. The switch portion includes multiple switch portions. Multiple spring constants are set for the multiple secondary transmission members, and are respectively different for uniforming a transmission degree of the vibration to the multiple switch portions.

According to another aspect of the present disclosure, the vehicle input device includes an interior panel that is an opaque plate-shaped member and provides a part of an interior of a vehicle, and multiple fixing portions for fixing the interior panel to the vehicle. In the interior panel, an operation area portion in which multiple symbols indicating multiple control contents in accordance with an instruction capable of being provided by an occupant and a non-operation area portion that is a portion other than the operation area portion are set. In a rear surface side of the operation area portion, a press sensor for detecting a press operation of a user on a switch portion and a vibrator that vibrates the operation area portion in an operation surface orthogonal direction are placed. The switch portion is a portion in which a symbol is placed in a surface of the operation area portion. The operation surface orthogonal direction is a direction orthogonal to the surface of the operation area portion. The vehicle input device includes a controller that specifies an operation content of the occupant based on a detection result of the press sensor and causes the vibrator to vibrate. The multiple fixing portion are placed in the non-operation area portion and not placed in the operation area portion. The interior panel is connected to a peripheral member by multiple vibration characteristic correction springs having multiple predetermined springs, in addition to the multiple fixing portions. Multiple spring constants are set for the multiple vibration characteristic correction springs, and are respectively different for uniforming the transmission degree of the vibration generated by the vibrator to the multiple switch portions.

The above configuration corresponds to a configuration causing one plate-shaped member (that is, interior panel) configuring a portion of the instrument panel with use of the press sensor to function as an operation panel. According to the above configuration, it may be possible to reduce the number of mechanical switches placed on the instrument panel or the like without using the display. Since symbols are added to the interior panel surface by printing or the like, the symbols are constantly present. The occupant can press the switch portions in which the symbols are placed at an arbitrary timing. That is, the user convenience is maintained.

The fixing portion is not placed in the operation area portion, and the vibrator vibrates the operation panel in the operation surface orthogonal direction. The operation panel is a plate-shaped member, and therefore is more likely to vibrate in the operation surface orthogonal direction than the operation panel parallel direction. This is because the plate-shaped member tends to be easily deformed (that is, curved) in the direction perpendicular to the plate surface. A portion away from the fixing portion in the operation panel easily vibrates as a vibration antinode. Therefore, it may be possible to more strongly transmit a vibration component to the occupant. In addition, the non-operation area portion is fixed to the vehicle by the fixing portion. Therefore, even when the occupant presses the non-operation area portion, the operation panel is difficult to move. According to such a configuration, it may be possible to reduce the risk that the occupant feels discomfort when pressing the non-operation area portion.

Hereinafter, an embodiment of the present disclosure will be described with reference to the drawings. FIG. 1 is a view showing one example of a schematic configuration of a vehicle input device 100 according to the present disclosure. Here, as one example, the vehicle input device 100 is configured as an input device for operating a behavior of an air conditioner mounted in a vehicle. The vehicle input device 100 is mounted in the vehicle together with the air conditioner (not shown). The vehicle input device 100 may be a device for an occupant to operate an audio device.

Figure 2:
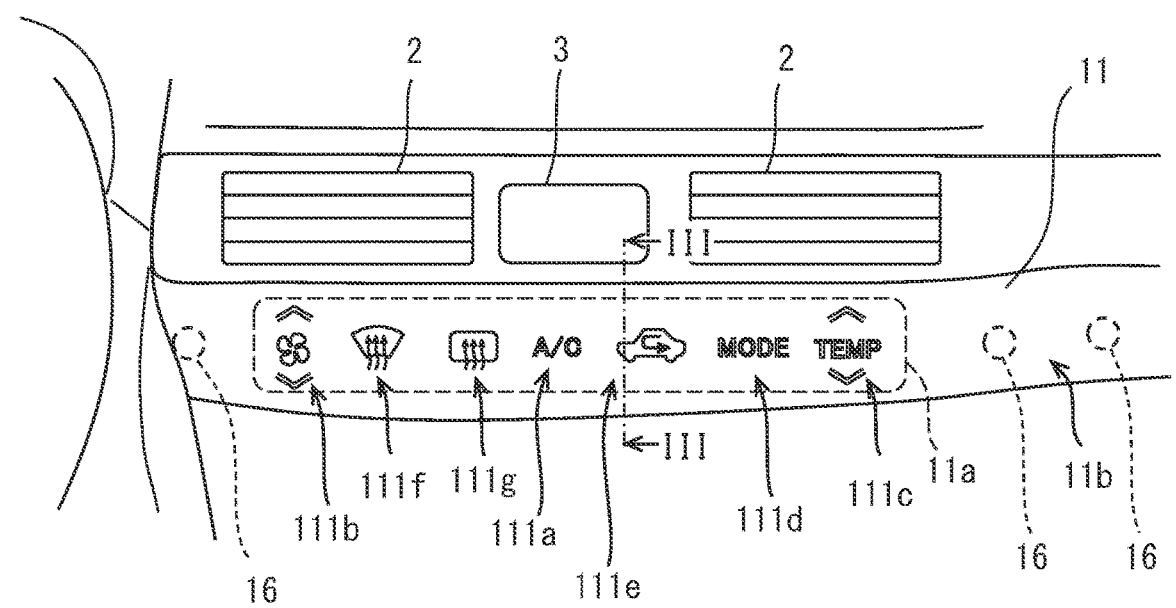
FIG. 2 is an enlarged view of a periphery of an operation area portion of the faceplate.

The vehicle input device 100 is implemented by using one of multiple interior panels configuring an instrument panel 1 as shown in FIG. 1 and FIG. 2. The interior panel corresponds to a part (so-called decorative part) that decorates the interior of the vehicle. For convenience, an interior panel providing an operation surface of the vehicle input device 100 among various interior panels configuring the instrument panel 1 is referred to as a faceplate 11. Here, the instrument panel 1 corresponds to a partition member (so-called bulkhead) that separates an engine room from the vehicle interior. The instrument panel 1 includes a dashboard portion. In the present embodiment, the instrument panel 1 is implemented by combining the multiple interior panels. However, the instrument panel 1 may be one module that is integrally molded. In this case, the instrument panel 1 itself corresponds to the faceplate 11.

In order to describe a configuration of each member and an attachment position, in the instrument panel 1, an area facing a left front seat of the vehicle is referred to as a left seat facing portion Ar1, and an area facing a right front seat of the vehicle is referred to as a right seat facing portion Ar2. An area between the left seat facing portion Ar1 and the right seat facing portion Ar2 is referred to as an instrument panel center portion Ar3. The instrument panel center portion Ar3 is also referred to as a center cluster. The instrument panel center portion Ar3 corresponds to a portion connected to a center console.

In the present embodiment, as one example, a driver seat is formed at the left side of the vehicle. That is, the left seat facing portion Ar1 is a portion facing the driver seat in the instrument panel 1. The right seat facing portion Ar2 corresponds to a portion facing a passenger seat in the instrument panel 1. Hereinafter, the "right" and the "left" are directions based on a vehicle front direction, and, for example, correspond to the right and the left for the occupant who sits on the driver seat and faces the front of the vehicle. In other words, the right side is a passenger seat side. The left side is the driver seat side. As another aspect, the driver seat may be formed on the right side of the vehicle.

The faceplate 11 is a plate member (so-called panel). A lateral direction of the faceplate 11 is a vehicle width direction. The faceplate 11 provides an operation surface for receiving a press operation by the occupant. The faceplate 11 has, for example, a length extending from a right end of the right seat facing portion Ar2 to a left end of the instrument panel center portion Ar3, as shown in FIG. 1. A length of the faceplate 11 in the vehicle width direction (in other words, a length in the lateral direction) is set to, for example, one meter. The length of the faceplate 11 may be 0.5 meters or 0.75 meters. A length of the faceplate 11 in the vertical direction (hereinafter, a width in a height direction) is set to about 5 to 20 centimeters. The height direction width of the faceplate 11 varies depending on a distance from the right end portion. For example, the portion corresponding to the right seat facing portion Ar2 in the faceplate 11 is formed to be narrower than (in other words, thinner than) the instrument panel center portion Ar3.

Figure 3:
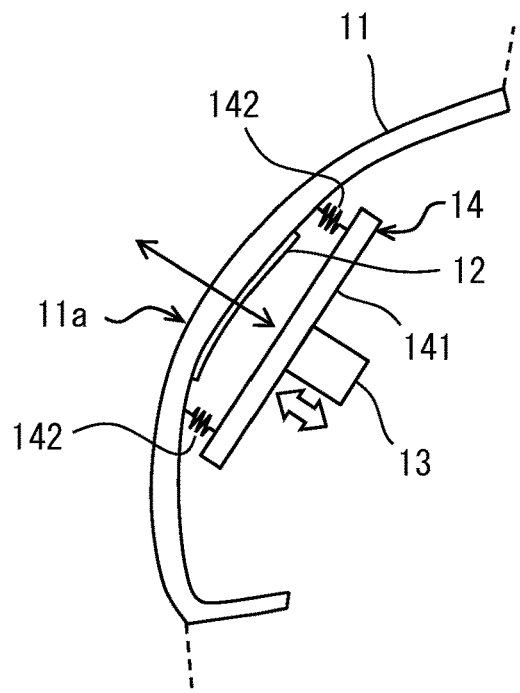
FIG. 3 is a conceptual view for illustrating a structure inside the faceplate.

The faceplate 11 is attached at a height similar to that of the base of a steering column cover. As shown in FIG. 3, for example, the faceplate 11 has a cross sectional shape in which a lower end portion of a surface portion facing the vehicle interior is curved so as to protrude toward the vehicle interior side as compared with the upper end portion. In the present embodiment, as one example, the faceplate 11 is a part that is placed under a face blowout port 2. However, the faceplate 11 is not limited to this. The faceplate 11 may be a part placed above the face blowout port 2. Next to the face blowout port 2, a display 3 for displaying an image of a current air-conditioning control mode set by the occupant or an index such as an air-conditioning temperature that is a control target is placed.

The entire of the faceplate 11 or the large portion of the faceplate 11 is an opaque member. For example, the faceplate 11 is implemented by applying a light-shielding paint to a base material formed of a translucent resin or the like by printing or painting. As the translucent base material, for example, an acrylic resin, a polycarbonate resin, or the like can be adopted. A portion to which the light-shielding paint is not applied in the faceplate 11 functions as a window portion for passing the light of a light emitting element (not shown) placed on a rear surface side of the faceplate 11 to a visual recognition side. The window portion is a configuration for presenting a selection state of a switch portion 111 described later to the occupant. The faceplate 11 may not have the window portion. The faceplate 11 may be implemented by using an opaque resin. The material of the faceplate 11 is not limited to the resin. The faceplate 11 may be implemented by appropriately combining wood, leather, material and the like.

Multiple symbols (hereinafter, function presentation symbols) indicating the control content that can be instructed by the occupant are applied to a predetermined area of a surface of the faceplate 11 by printing or the like. The faceplate 11 is virtually divided into an operation area portion 11a in which the multiple function presentation symbols are placed and a non-operation area portion 11b that is a portion other than the operation area portion. The operation area portion 11a is formed in an area corresponding to the instrument panel center portion Ar3 in the faceplate 11. According to another viewpoint, the operation area portion 11a is formed at the left of the center of the faceplate 11. The non-operation area portion 11b is formed in an area corresponding to the right seat facing portion Ar2 in the faceplate 11.

Portions to which the function presentation symbols are applied in the operation area portion 11a function as switches for the occupant to operate the air conditioner in cooperation with a press sensor 12 described later or the like. That is, the occupant can instruct the air conditioner to execute the control in accordance with the function symbol by pressing the surface portion to which the function symbol is applied in the faceplate 11. The individual portions to which the function presentation symbols are applied in the faceplate 11 (particularly, the operation area portion 11a) are referred to as switch portions 111.

For example, in the operation area portion 11a, as the switch portions 111, an air-conditioning switch portion 111a, an air volume adjustment switch portion 111b, a temperature adjustment switch portion 111c, a blowout mode switch portion 111d, an inside-outside air selection switch portion 111e, a defroster switch portion 111f, and a rear defogger switch portion 111g are placed.

The air-conditioning switch portion 111a is the switch portion 111 for switching an ON state and an OFF state of a cooling-dehumidifying function. The air volume adjustment switch portion 111b is the switch portion 111 for adjusting the air volume. In details, the air volume adjustment switch portion 111b includes an air volume up switch portion for increasing the air volume and an air volume down switch portion for decreasing the air volume. The temperature adjustment switch portion 111c is the switch portion 111 for adjusting the temperature of the air. In details, the temperature adjustment switch portion 111c includes a temperature up switch portion for increasing the temperature and a temperature down switch portion for decreasing the temperature. The blowout mode switch portion 111d is the switch portion 111 for changing the combination of the outlets capable of blowing out the conditioned air. The inside-outside air selection switch portion 111e is the switch portion 111 for switching between an inside air circulation and an outside air intake. The defroster switch portion 111f is the switch portion 111 for operating the air conditioner so as to remove the cloudiness of a windshield. The rear defogger switch portion 111g is the switch portion 111 for operating the air conditioner so as to remove the cloudiness of a rear glass.

The symbol indicating the control content associated with the switch portion 111 is applied to the surface of each switch portion 111. A function provided by the switch portion 111 placed in the operation area portion 11a may be set so as to correspond to the function of the air conditioner. If the air conditioner has a blowout mode, an automatic control function of automatically adjusting the air volume or the like so as to maintain the temperature set by the occupant, the switch portion 111 for instructing the air conditioner to enable the automatic control function may be placed in the operation area portion 11a.

The operation area portion 11a, the non-operation area portion 11b, and the switch portion 111 refer to a portion of the faceplate 11. The operation area portion 11a, the non-operation area portion 11b, and the switch portion 111 are physically (in other words, substantially), integrally, and continuously connected. That is, the switch portion 111 does not move independently of the peripheral portion by the press operation of the occupant. In this respect, the switch portion 111 is different from the mechanical switch. The operation area portion 11a corresponds to an area including the multiple switch portions 111 and separated portions between the multiple switch portions 111.

Figure 4:
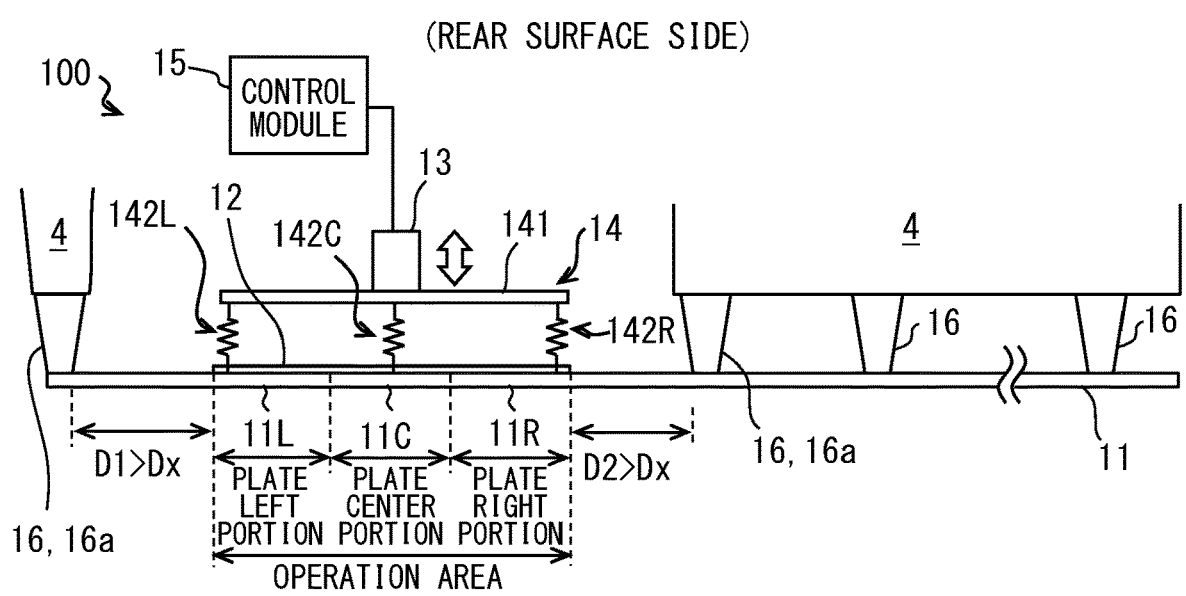
FIG. 4 is a conceptual view for illustrating a structure inside the faceplate.

FIG. 4 is a view for illustrating a structure of the vehicle input device 100. FIG. 4 conceptually shows a configuration when the vehicle input device 100 is viewed from above. As shown in FIG. 4, the vehicle input device 100 includes, in addition to the faceplate 11 described above, the press sensor 12, a vibrator 13, a vibration transmission member 14, and a control module 15.

As shown in FIG. 4, the faceplate 11 is fixed to a peripheral member 4 at a position separated from the operation area portion 11a by a predetermined deflection provision distance Dx or more. That is, a configuration (hereinafter, fixing portion) 16 fixing the faceplate 11 to the peripheral member 4 is appropriately placed in an area away from the operation area portion 11a by the deflection provision distance Dx or more in the non-operation area portion 11b. As the fixing portion 16, various structures such as, for example, a snap fit, a screw tightening structure, and the like can be employed. Here, the peripheral member 4 is a member corresponding to an attachment destination of the faceplate 11 such as a vehicle frame or another adjacent interior panel. In FIG. 2, one example of the position of the fixing portion 16 is shown transparently.

A D1 shown in FIG. 4 represents a separation between the fixing portion 16 that is placed at a position closest to the operation area portion 11a and at the left of the operation area portion 11a and the operation area portion 11a. A D2 represents a separation between the fixing portion 16 that is placed at a position closest to the operation area portion 11a and at the right of the operation area portion 11a and the operation area portion 11a. The fixing portion 16 that is placed at the position closest to the operation area portion 11a and at the left of the operation area portion 11a and the fixing portion 16 that is placed at the position closest to the operation area portion 11a and at the right of operation area portion 11a are referred to as proximity fixing portions 16a.

The separation from the fixing portion 16 to the operation area portion 11a is secured by the deflection provision distance Dx, and is a configuration for causing the vibrator 13 to vibrate the operation area portion 11a in an operation surface orthogonal direction. Here, the operation surface orthogonal direction is a direction orthogonal to the operation area portion 11a, and corresponds to a front-rear direction for the occupant seated in the driver seat or the like.

The proximity fixing portions 16a are points that serves as nodes when the operation area portion 11a vibrates in the operation surface orthogonal direction. That is, the proximity fixing portion 16a corresponds to a fixing end for the operation area portion 11a. The deflection provision distance Dx is determined based on the rigidity of the faceplate 11. By setting a distance from the operation area portion 11a to the proximity fixing portion 16a to the deflection provision distance Dx or more, also the switch portion 111 placed at the right end or the left end of the operation area portion 11a can vibrate similarly to the switch portion 111 at the central portion. The deflection provision distance Dx is preferably set to about several centimeters such as, for example, 2 centimeters. The configuration in which the separation between the proximity fixing portion 16a and the operation area portion 11a is set to the deflection provision distance Dx or more corresponds to a configuration in which the fixing portion 16 is not placed in a range within the deflection provision distance Dx from the switch portion 111.

The press sensor 12 is a sensor for detecting the occupant's press operation on the switch portion 111. It is attached to a surface (that is, back surface) on a rear surface side of the operation area portion 11a. The press sensor 12 is implemented by using, for example, a capacitance sensor. Specifically, the press sensor 12 detects a touch position based on change of the capacitance detected by an electrostatic film applied to the back surface of the operation area portion 11a. The electrostatic film is a transparent electrode film that detects the change in capacitance. The electrostatic film has, for example, the substantially same dimensions as the operation area portion 11a, and is attached so as to cover the entire back surface of the operation area portion 11a. The press sensor 12 sequentially outputs a signal indicating the occupant's touch position on the operation area portion 11a to the control module 15.

The electrostatic film configuring the press sensor 12 may be individually placed for each switch portion 111. The press sensor 12 may detect the touch position by a surface type capacitance system, or may detect the touch position by a projection type capacitance system. The press sensor 12 can be implemented by various configurations other than the capacitance system. For example, the press sensor 12 may be implemented by using a so-called pressure-sensitive sensor (in other words, resistance film type sensor) that detects the press operation of the occupant based on the resistance value change caused by a contact pressure.

The vibrator 13 is a configuration for vibrating the operation area portion 11a in the operation surface orthogonal direction. The vibrator 13 is driven by the control signal input from the control module 15. The vibrator 13 is mechanically connected to the operation area portion 11a via the vibration transmission member 14 described later. The vibration generated by the vibrator 13 is transmitted to the operation area portion 11a via the vibration transmission member 14, and the operation area portion 11a is vibrated in the operation surface orthogonal direction.

As the vibrator 13, various configurations such as an electromagnetic actuator such as an electromagnetic solenoid or a voice coil motor, a vibration body such as a piezo, further, and a combination of the vibrator 13 and a spring can be employed. The vibrator 13 according to the present embodiment only needs to be capable of, at least, generating the vibration in at one axial direction (specifically, the operation surface orthogonal direction).

For example, the vibrator 13 reciprocates a permanent magnet as the vibration body by performing a drive control of repeating excitation and non-excitation of the electromagnetic solenoid, and generates the vibration. That is, the vibrator 13 is configured as a solenoid type vibration generator. The vibrator 13 is attached to a primary transmission member 141 in a posture in which the axial direction of the vibration matches with the operation surface orthogonal direction. Here, the match is not limited to an exact match, and includes a near match.

The vibrator 13 may be implemented by using an eccentric motor. The white-painted arrows in FIG. 3 and FIG. 4 indicate the vibration direction of the vibrator 13. In the present embodiment, one vibrator 13 is used to vibrate all the switch portions 111. However, it is not limited to this. Multiple (for example, two) vibrators 13 may be placed. It is necessary that one vibrator 13 vibrates the multiple switch portions 111. The visual recognition side refers to a direction from the faceplate 11 toward the vehicle interior. The rear surface side refers to the opposite direction.

The vibration transmission member 14 is a configuration for transmitting the vibration generated by the vibrator 13 to the operation area portion 11a. The vibration transmission member 14 includes one primary transmission member 141 and multiple secondary transmission members 142. The primary transmission member 141 is connected to the vibrator 13 and the multiple secondary transmission members 142, and has a function of transmitting the vibration of the vibrator 13 to each of the multiple secondary transmission members 142.

The primary transmission member 141 is a structure having the rigidity that causes the primary transmission member 141 to be hardly elastically deformed in a range of the force generated by the vibrator 13 on appearance. That is, the primary transmission member 141 is substantially regarded as a rigid body. The primary transmission member 141 may be implemented by using, for example, a metal plate or a resin (for example, phenol resin) having a predetermined strength. In the present specification, a component that is substantially regarded as the rigid body in the magnitude range of the force output from the vibrator 13.

The primary transmission member 141 is formed in the plate shape, for example. The dimension of the primary transmission member 141 in a front view is set to be about the same as that of the operation area portion 11a. The dimension of the primary transmission member 141 in the front view may be set to be larger than that of the operation area portion 11a or set to be smaller than that of the operation area portion 11a. Here, the front view corresponds to a direction from the visual recognition side to the rear surface side.

The primary transmission member 141 is placed on the rear surface side of the faceplate 11 so as to face the operation area portion 11a. It is necessary that the primary transmission member 141 has a flat portion facing the operation area portion 11a. The shape is not limited to the plate shape. As the primary transmission member 141, various shapes can be employed. The primary transmission member 141 may be a structure in which multiple parts are combined. For example, the primary transmission member 141 may be a module in which a circuit board or a light emitting element is attached to a resin/metal material.

The secondary transmission member 142 is a configuration for transmitting the vibration transmitted from the vibrator 13 to the primary transmission member 141 to the faceplate 11 (particularly, operation area portion 11a). The secondary transmission member 142 has a function of physically connecting the primary transmission member 141 and the vibrator 13 to the faceplate 11. The multiple secondary transmission members 142 correspond to support structures for the primary transmission member 141 or the vibrator 13.

The secondary transmission members 142 are separately placed in the vehicle width direction. In one example of the present embodiment, three secondary transmission members 142 are separately placed on the left and the right. Specifically, the faceplate 11 is connected to the primary transmission member 141 at three portions of a plate left portion 11L, a plate center portion 11C, and a plate right portion 11R via the secondary transmission member 142. The plate left portion 11L, the plate center portion 11C, and the plate right portion 11R are areas (in other words, sub areas) obtained by virtually dividing the operation area portion 11a along the vehicle width direction.

When the multiple secondary transmission members 142 are distinguished, the secondary transmission member 142 connected to the plate left portion 11L is described as a left secondary transmission member 142L. The secondary transmission member 142 connected to the plate center portion 11C may be described as a center secondary transmission member 142C. The secondary transmission member 142 connected to the plate right portion 11R is described as a right secondary transmission member 142R. Each secondary transmission member 142 has the rigidity sufficient to transmit the vibration of the vibrator 13 to the operation area portion 11a. For example, each secondary transmission member 142 is configured as a resin spring utilizing the elasticity of the resin.

For the vibration of the operation area portion 11a, the proximity fixing portion 16a is a node. Therefore, in the operation area portion 11a, the vibration characteristic differs depending on a distance from the proximity fixing portion 16a. A portion away from the proximity fixing portion 16a is more likely to vibrate. Specifically, the plate center portion 11C is more likely to vibrate than the plate right portion 11R or the plate left portion 11L. Therefore, when it is assumed that each secondary transmission member 142 is a member having the same rigidity, the tactile sensation (substantially, vibration strength) felt by the occupant at the time of pressing the switch portion 111 may differ depending on a location in each operation area portion 11a.

In the present embodiment, attention is paid to the above difficulty. For providing the similar vibration sensation when any switch portion 111 is pressed, the spring constants of the secondary transmission members 142 are set to different values. Specifically, the right secondary transmission member 142R and the left secondary transmission member 142L have the spring constant (that is, high rigidity) higher than that of the center secondary transmission member 142C. The right secondary transmission member 142R and the left secondary transmission member 142L may have the same spring constant or may have different spring constants. The spring constant provided by the member can be adjusted by the structure, the material, or the combination of the structure and the material.

The spring constant of each secondary transmission member 142 may be adjusted based on the distance from the connection point with the operation area portion 11a to the proximity fixing portion 16a. The closer the distance to the proximity fixing portion 16a, the higher the spring constant may be set. The higher the spring constant of the secondary transmission member 142, the easier the transmission of the vibration to the connection portion at the operation area portion 11a. The spring constant of each secondary transmission member 142 is preferably determined in consideration of the degree of the curvature of the portion attached to the secondary transmission member 142 in the faceplate 11. That is because the stronger the degree of the curvature, the less likely it is to vibrate. That is, it is preferable that the secondary transmission member 142 attached at a place having the large degree of curvature has a relatively high spring constant. It is necessary that the vibration transmission member 14 relatively strongly transmits the vibration of the vibrator 13 to a portion that is relatively difficult to vibrate in the operation area portion 11a. Thereby, uniform tactile feedback is implemented regardless of the position of the switch portion 111.

The control module 15 controls the behavior of the vehicle input device 100. The control module 15 is configured as a computer including a Central Processing Unit (CPU), a flash memory, a Random Access Memory (RAM), an Input/Output (I/O), and a bus line connecting these components. The control module 15 may be implemented by using a Graphics Processing Unit (GPU) or Microprocessing Unit (MPU) instead of the CPU. Further, the control module 15 may be implemented by a combination of the CPU, the GPU, and the MPU. The flash memory is a non-volatile and rewritable memory, and stores a program (hereinafter, input device program) for causing a computer to function as the control module 15. Various non-transitory tangible storage mediums can be employed as a specific storage medium of the input device program. The execution of the input device program through the CPU corresponds to execution of a method corresponding to the input device program. The control module 15 may be implemented by using a dedicated Integrated Circuit (IC).

Figure 5:
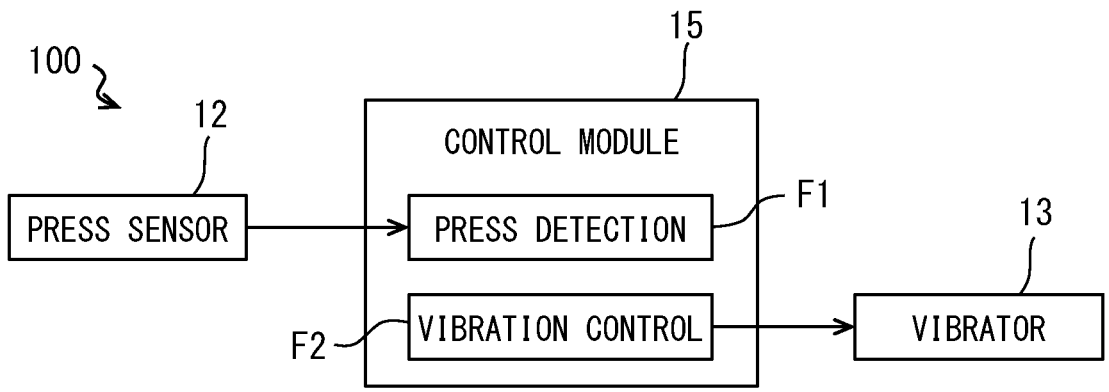
FIG. 5 is a functional block diagram of a control module.

The control module 15 includes, as functional blocks, a press detector F1 and a vibration controller F2, as shown in FIG. 5. The press detector F1 detects the occupant's press on the switch portion 111 based on an output signal (in other words, detection result) from the press sensor 12. For example, the press detector F1 specifies the switch portion 111 pressed by the occupant based on a touch position signal provided from the press sensor 12. When the press sensor 12 is individually placed for each switch portion 111, the switch portion 111 pressed by the occupant may be specified based on the output signal of each press sensor 12. The occupant operation content (specifically, information of the switch pressed by the occupant) specified by the press detector F1 is transmitted to an air conditioning Electronic Control Unit (ECU) (not shown), and the operation of the air conditioner is controlled. The air conditioning ECU is an ECU that controls the operation of the air conditioner.

The vibration controller F2 outputs a drive signal to the vibrator 13 and causes the vibrator 13 to vibrate when the press detector F1 detects at least one of the multiple switch portions 111. A vibration pattern may be appropriately designed.

Effect of Present Embodiment

According to the above configuration, one opaque plate-shaped member (hereinafter, interior panel) configuring a part of the instrument panel 1 functions as the operation panel by using the electrostatic sensor or the like. According to the above configuration, it may be possible to reduce the number of mechanical switches placed on the instrument panel or the like without using the display. According to the above configuration, it may be possible to obtain the high design property with no unevenness on the panel surface. As the result, it may be possible to improve a commercial value.

As another configuration (hereinafter, first assumption configuration) causing one interior panel to function as the operation panel, a configuration vibrating the interior panel in a direction parallel with the operation surface in accordance with the press operation on the switch possible can be assumed. The operation surface parallel direction is, for example, a vertical/horizontal direction. That is because the vibration as the tactile feedback may be often generated in the operation surface parallel direction.

However, generally, the interior panel is fixedly assembled to the peripheral member at the edge portion. Therefore, one interior panel (hereinafter, operation function addition panel) functioning as the operation panel is difficult to move in the operation surface parallel direction. That is, in the assumed configuration, the vibration applied by the vibrator to the operation function addition panel is difficult to be transmitted to a hand of the user. The operation function addition panel is a configuration that corresponds to the faceplate 11 of the embodiment.

The vibrator 13 of the present embodiment applies the vibration in the operation surface orthogonal direction. The faceplate 11 is the substantially plate-shaped member. Therefore, even when the faceplate 11 is fixed to the peripheral member 4 at the edge portion, the faceplate 11 vibrates in the operation surface orthogonal direction due to the bending. In particular, a portion away from the fixing portion 16 easily vibrates as a vibration antinode. Therefore, according to the configuration of the present embodiment, it may be possible to more strongly transmit the vibration component as the tactile feedback to the occupant as compared with the assumption configuration.

In the present embodiment, the fixing portion 16 is formed at the position away from the operation area portion 11a by the deflection provision distance Dx or more. Therefore, the vibrator 13 is more likely to vibrate in the operation surface orthogonal direction. In such an aspect, the operation area portion 11a sufficiently vibrates in the operation surface orthogonal direction, and it may be possible to provide the operation feeling to the occupant.

In the assumption configuration described above, a difficulty that the vibration as the tactile feedback is difficult to be transmitted to the hand of the occupant occurs. Regarding the difficulty, a configuration (hereinafter, second assumption configuration) in which the operation function addition panel is attached to the peripheral member with use of a rubber-like elastic part in order to transmit the vibration of the vibrator to the user hand is assumed.

However, since the operation function addition panel is a relatively large decorative part, many portions (that is, non-operation area) where the switch portion is not placed exist in the operation function addition panel. If a configuration in which the operation function addition panel is locked to the peripheral configuration with the rubber-like elastic part is adopted, even when the user presses the non-operation area portion, the panel moves due to the elastic force and the user feels discomfort.

On the other hand, in the above configuration, the non-operation area portion 11b is fixed to the vehicle. Therefore, even when the occupant presses the non-operation area portion 11b, the faceplate 11 is difficult to move. That is, it may be possible to reduce the risk that the occupant feels discomfort when the occupant presses the non-operation area portion 11b. According to the above configuration, it may be possible to achieve both of the operation feeling at the time of pressing the switch and the stability feeling of the non-operation area portion 11b.

In addition, in the above configuration, the faceplate 11 is vibrated in the operation surface orthogonal direction. The operation surface orthogonal direction substantially matches with the front-rear direction for the occupant at the driver seat or the passenger seat. Generally, the movement of the object in the front-rear direction is more difficult to be perceived as compared with the vibration of the object in the up-down direction and the left-right direction. The displacement amount of the object vibration in the up-down direction and the left-right direction directly appears. On the other hand, the displacement amount of the vibration in the front-rear direction does not directly appear, and appears as a slight change in perspective. Therefore, according to the above embodiment, the occupant is less likely to perceive the vibration of the faceplate 11, as compared with the configuration of vibrating the faceplate 11 in parallel with the operation surface like the first assumption configuration and the second assumption configuration. Therefore, it may be possible to more reduce the risk of providing the feeling of the discomfort to the occupant.

The primary transmission member 141 is connected the operation area portion 11a with use of the secondary transmission members 142 having the different spring constants. The spring constant of each secondary transmission member 142 is set to a value in accordance with a distance from the fixing portion 16 placed at the portion at the left or/and the right of the operation area portion 11a so that the transmission degrees of the vibration to the switch portions 111 become uniform. Thereby, even when the occupant presses any of the switch portions 111, it may be possible to obtain the uniform vibration feeling.

Members having a function identical to that of the members described in the above embodiment will be denoted by identical reference signs and will not be described repeatedly. In a case where only a part of any configuration is described, the preceding embodiment is applicable to the remaining part of the configuration.

First Modification

Figure 6:
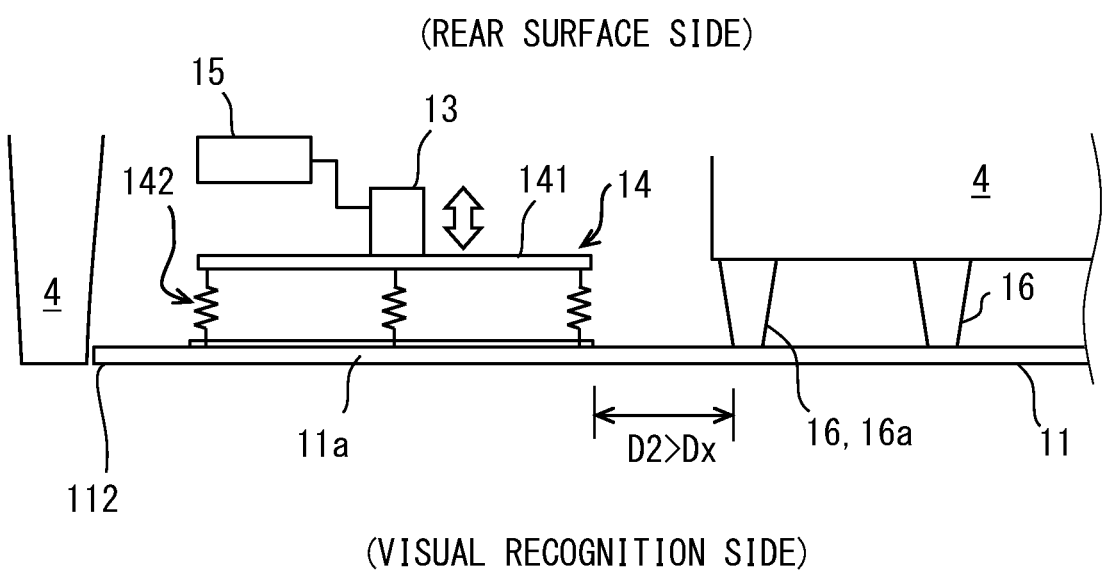
FIG. 6 is a conceptual view for illustrating a support structure of the faceplate according to a first modification.

In the configuration in which the operation area portion 11a is placed at the left of the center of the faceplate 11, as shown in FIG. 6, a left end portion 112 of the faceplate 11 is placed as an open end. The configuration in which the left end portion 112 is the open end corresponds to a cantilever structure in which the faceplate 11 is locked to the vehicle with use of a portion at the right of the operation area portion 11a. According to the configuration, the operation area portion 11a is more likely to vibrate in the operation surface orthogonal direction. That is, without changing the performance of the vibrator 13 or the number of vibrators 13, it may be possible to strengthen the tactile feedback. The left end portion 112 corresponds to an end of faceplate 11 on the side of the operation area portion 11a. In the configuration of the present modification, it is unnecessary that the distance D1 from the operation area portion 11a to the left end portion 112 is equal to or more than the deflection provision distance Dx.

Second Modification

Figure 7:
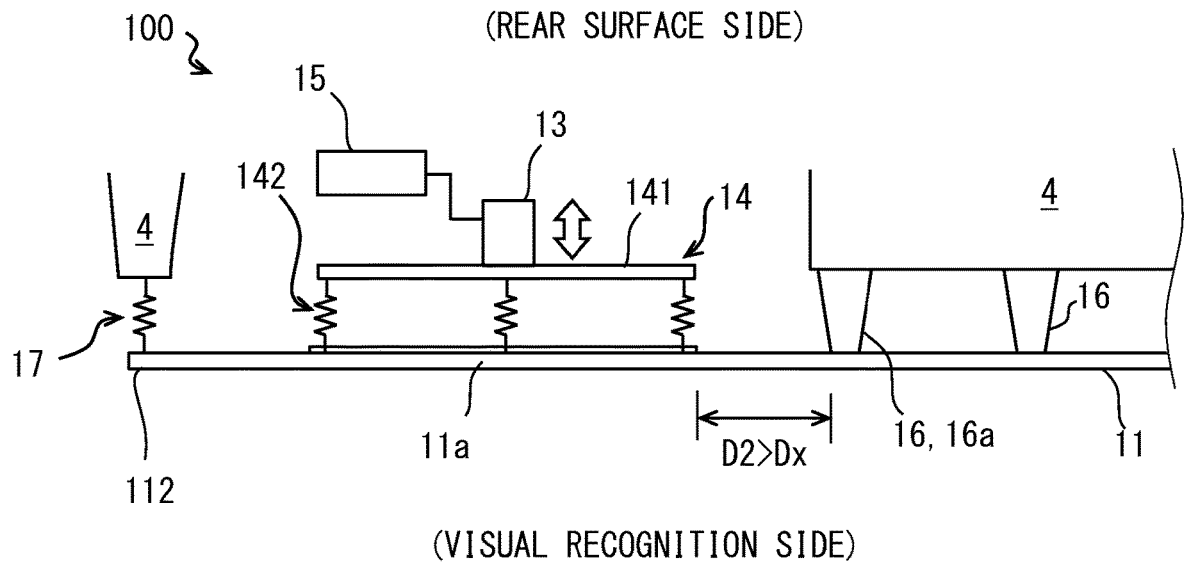
FIG. 7 is a conceptual view for illustrating a support structure of the faceplate according to a second modification.

In a configuration in which the operation area portion 11a is placed at the left of the center of the faceplate 11, as shown in FIG. 7, the left end portion 112 is connected to the peripheral member 4 with use of an elastic member 17 having a predetermined spring constant. That is, the left end portion 112 may be a semi-free end using a spring structure.

Third Modification

Figure 8:
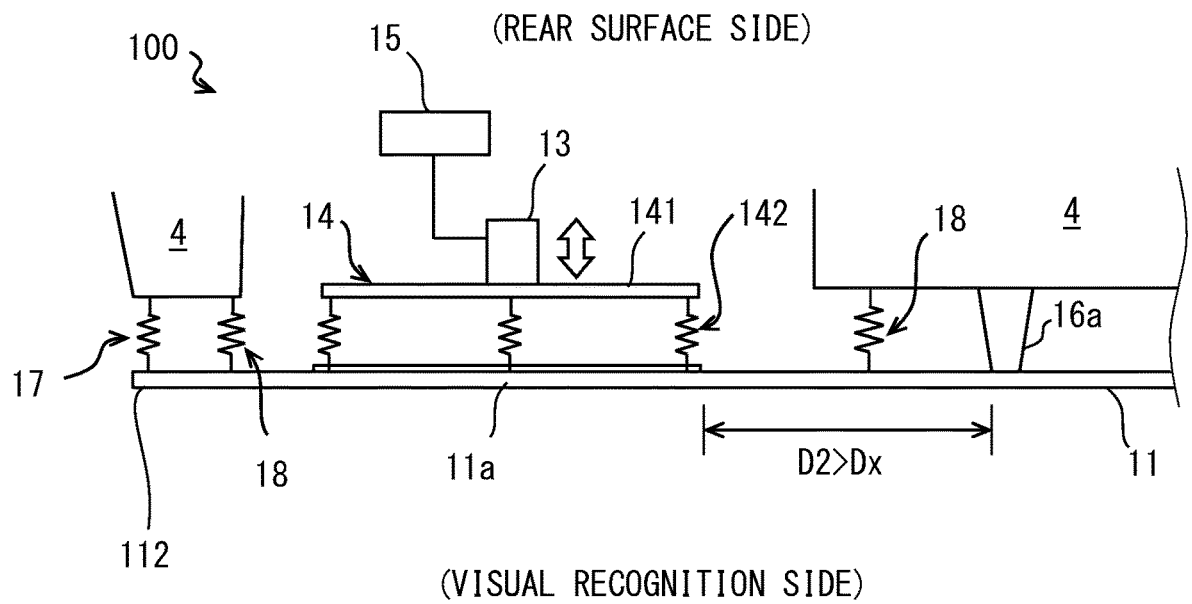
FIG. 8 is a conceptual view for illustrating a support structure of the faceplate according to a third modification.

As shown in FIG. 8, in the peripheral of the operation area portion 11a, multiple elastic members (hereinafter, auxiliary springs 18) elastically connecting the faceplate 11 to the peripheral member 4 may be placed. The multiple auxiliary springs 18 are configurations for uniforming the operation feeling when the switch portion 111 is pressed. Spring constants that differ depending on the positions are set for the multiple auxiliary springs 18. An area corresponding to the non-operation area portion 11b in the faceplate 11 may be connected to the peripheral member 4 by the multiple fixing portions 16. At least, the non-operation area portion 11b may be more difficult to move in the operation surface orthogonal direction than the operation area portion 11a. The auxiliary spring 18 corresponds to a vibration characteristic correction spring.

Fourth Modification

Figure 9:
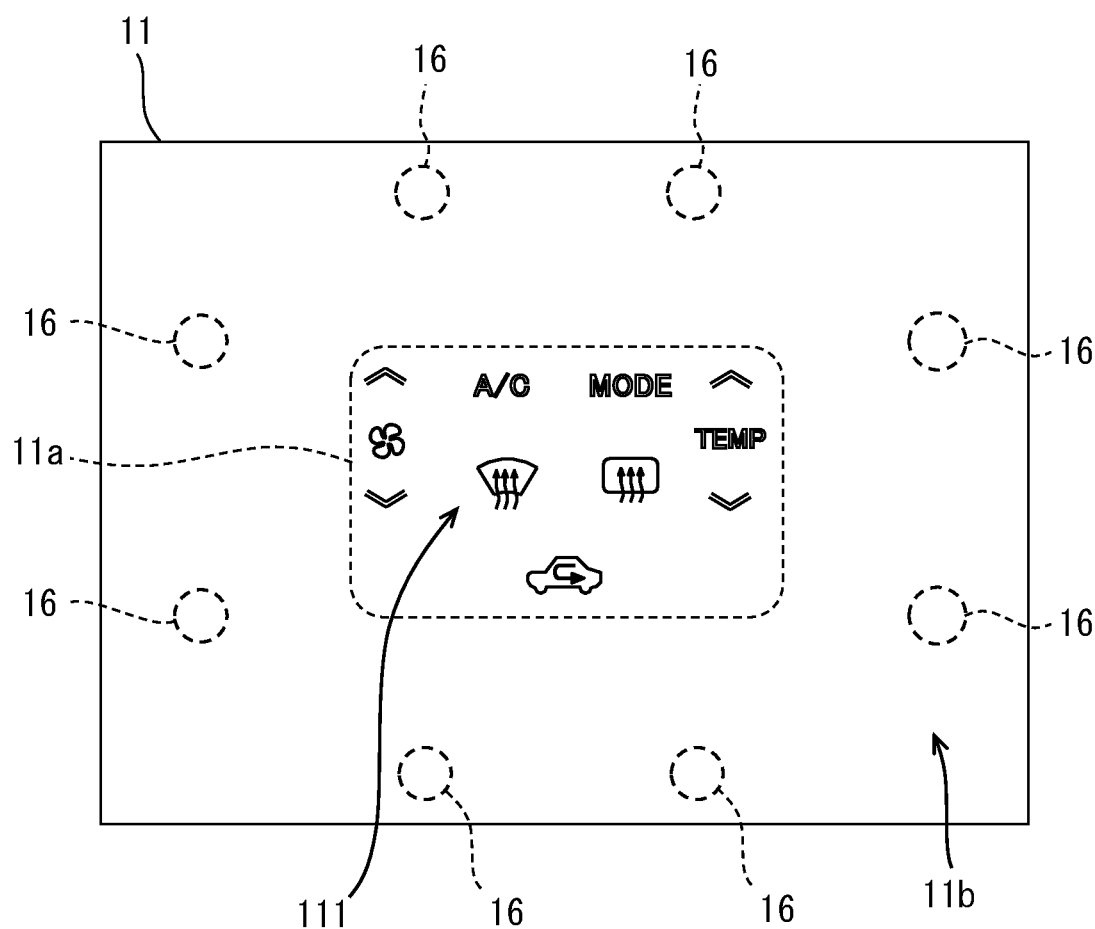
FIG. 9 is a conceptual view for illustrating an arrangement aspect of a fixing portion according to a fourth modification.

The embodiment described above shows the aspect that the faceplate 11 is a horizontally long member and the fixing portions 16 are placed at the left or the right of the operation area portion 11a, that is, dispersedly placed in the lateral direction. However, it is not limited to this. When there is the non-operation area portion 11b having the sufficient size around (above, under, at the left of, at the right of) the operation area portion 11a, as shown in FIG. 9, the fixing portions 16 may be placed not only at the right and left of the operation area portion 11a but also above and under the operation area portion 11a.

Fifth Modification

Although the aspect that the vehicle input device 100 is applied to the instrument panel 1 is shown, the application target of the vehicle input device 100 is not limited to the instrument panel 1. The vehicle input device 100 may be applied to, as an input device for opening and closing the vehicle window or adjusting a door mirror position, an inside surface (so-called door trim) of a door for the driver seat. That is, the faceplate 11 may be a panel configuring a part of the door trim. The vehicle input device 100 may be applied to, as a steering switch, a steering. The vehicle input device 100 may be placed near an area under the instrument panel 1, and may be used only for opening and closing a trunk door or an oil filler port.

Software stored in a tangible memory and a computer executing the software, only the software, only hardware, or combination of them may be possible to provide a method and/or function provided by the control module 15. A part or all of the functions of the control module 15 may be implemented as hardware. A configuration in which a certain function is implemented as hardware includes a configuration in which the function is implemented by using one or more ICs or the like. For example, when a part of the functions or all of the functions of the control module 15 is provided by an electronic circuit being hardware, it may be possible to provide it with used of a digital circuit including multiple logic circuits or analog circuits. The control module 15 may be provided by one computer, or a set of computer resources linked via a data communication device.

In the above, the embodiments, the configurations, the aspects of the vehicle input device according to the present disclosure are exemplified. The present disclosure is not limited to the above-described embodiments, each configuration and each aspect related to the present disclosure. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A vehicle input device comprising:
an interior panel that is an opaque plate-shaped member and is configured to provide a portion of an interior of a vehicle; and
a plurality of fixing portions for fixing the interior panel to the vehicle,
wherein:
in the interior panel, an operation area portion in which a plurality of symbols indicating a plurality of control contents in accordance with an instruction capable of being provided by an occupant and a non-operation area portion that is a portion other than the operation area portion are set;
on a rear surface side of the operation area portion, a press sensor for detecting a press operation of a user on a switch portion and a vibrator configured to vibrate the operation area portion in an operation surface orthogonal direction are placed;
the switch portion is a portion in which the plurality of symbols are placed in a surface of the operation area portion;
the operation surface orthogonal direction is a direction orthogonal to the surface of the operation area portion;
the vehicle input device includes a controller configured to specify an operation content of the occupant based on a detection result of the press sensor and cause the vibrator to vibrate;
the plurality of fixing portions are placed in the non-operation area portion and are not placed in the operation area portion;
the operation area portion and the vibrator are connected via a primary transmission member for transmitting vibration generated by the vibrator to the operation area portion;
the primary transmission member and the operation area portion are connected by a plurality of secondary transmission members having elasticity;
each of the plurality of secondary transmission members is connected to a different position of the operation area portion;
the switch portion includes a plurality of switch portions; and
a plurality of spring constants are set for the plurality of secondary transmission members, and are respectively different for uniforming a transmission degree of the vibration to the plurality of switch portions.

2. The vehicle input device according to claim 1, wherein: the plurality of spring constants of the plurality of secondary transmission members become larger as a distance from a connection point with the operation area portion to the fixing portion becomes shorter.

3. The vehicle input device according to claim 1, wherein: the interior panel is a plate-shaped member that is curved; a spring constant of a secondary transmission member connected to a portion having a large degree of curvature in the operation area portion is set to be larger than a spring constant of a secondary transmission member connected to a portion having a small degree of the curvature.

4. The vehicle input device according to claim 1, wherein: each of the plurality of fixing portions is placed at a position, in the non-operation area portion, separated from the operation area portion by a predetermined distance or more for enabling the operation area portion to vibrate in the operation surface orthogonal direction.

5. The vehicle input device according to claim 1, wherein: the interior panel is connected to a peripheral member by a plurality of vibration characteristic correction springs having a plurality of predetermined springs, in addition to the plurality of fixing portions; and
a plurality of spring constants are set for the plurality of vibration characteristic correction springs, and are respectively different for uniforming the transmission degree of the vibration generated by the vibrator to the plurality of switch portions.

6. The vehicle input device according to claim 1, wherein: the interior panel is a portion of an instrument panel and has a length of 0.5 meters or more in a vehicle width direction.

7. The vehicle input device according to claim 1, wherein: the interior panel is a portion of an interior surface of a door for a driver seat.

8. The vehicle input device according to claim 1, wherein: the vibrator is a solenoid type vibration generator configured to generate the vibration in one axial direction with use of a solenoid and a permanent magnet as a vibration body; and
the vibrator is attached in a posture in which the one axial direction matches with the operation surface orthogonal direction.

9. A vehicle input device comprising:
an interior panel that is an opaque plate-shaped member and is configured to provide a portion of an interior of a vehicle; and
a plurality of fixing portions for fixing the interior panel to the vehicle,
wherein:
in the interior panel, an operation area portion in which a plurality of symbols indicating a plurality of control contents in accordance with an instruction capable of being provided by an occupant and a non-operation area portion that is a portion other than the operation area portion are set;
on a rear surface side of the operation area portion, a press sensor for detecting a press operation of a user on a switch portion and a vibrator configured to vibrate the operation area portion in an operation surface orthogonal direction are placed;
the switch portion is a portion in which the plurality of symbols are placed in a surface of the operation area portion;
the operation surface orthogonal direction is a direction orthogonal to the surface of the operation area portion;
the vehicle input device includes a controller configured to specify an operation content of the occupant based on a detection result of the press sensor and cause the vibrator to vibrate;
the plurality of fixing portions are placed in the non-operation area portion and are not placed in the operation area portion;
the interior panel is connected to a peripheral member by a plurality of vibration characteristic correction springs having a plurality of predetermined springs, in addition to the plurality of fixing portions; and
a plurality of spring constants are set for the plurality of vibration characteristic correction springs, and are respectively different for uniforming the transmission degree of the vibration generated by the vibrator to the plurality of switch portions.

10. The vehicle input device according to claim 9, wherein:
the operation area portion and the vibrator are connected via a primary transmission member for transmitting vibration generated by the vibrator to the operation area portion;
the primary transmission member and the operation area portion are connected by a plurality of secondary transmission members having elasticity;
each of the plurality of secondary transmission members is connected to a different position of the operation area portion;

the switch portion includes a plurality of switch portions; and a plurality of spring constants are set for the plurality of secondary transmission members, and are respectively different for uniforming a transmission degree of the vibration to the plurality of switch portions.

11. The vehicle input device according to claim 10, wherein:

the plurality of spring constants of the plurality of secondary transmission members become larger as a distance from a connection point with the operation area portion to the fixing portion becomes shorter.

12. The vehicle input device according to claim 10, wherein:

the interior panel is a plate-shaped member that is curved;

a spring constant of a secondary transmission member connected to a portion having a large degree of curvature in the operation area portion is set to be larger than a spring constant of a secondary transmission member connected to a portion having a small degree of the curvature.

13. The vehicle input device according to claim 9, wherein:

each of the plurality of fixing portions is placed at a position, in the non-operation area portion, separated from the operation area portion by a predetermined distance or more for enabling the operation area portion to vibrate in the operation surface orthogonal direction.

14. The vehicle input device according to claim 9, wherein:

the interior panel is a portion of an instrument panel and has a length of 0.5 meters or more in a vehicle width direction.

15. The vehicle input device according to claim 9, wherein:

the interior panel is a portion of an interior surface of a door for a driver seat.

16. The vehicle input device according to claim 9, wherein:

the vibrator is a solenoid type vibration generator configured to generate the vibration in one axial direction with use of a solenoid and a permanent magnet as a vibration body; and the vibrator is attached in a posture in which the one axial direction matches with the operation surface orthogonal direction.

* * * * *